United States Patent
Kota et al.

(10) Patent No.: US 9,116,842 B2
(45) Date of Patent: Aug. 25, 2015

(54) AVOIDING RESTART ON ERROR IN DATA INTEGRATION

(71) Applicant: International Business Machines Corporation, Armonk, NY (US)

(72) Inventors: Sastry V. Kota, Hyderabad (IN); Srinivas K. Mittapalli, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 13/803,442

(22) Filed: Mar. 14, 2013

(65) Prior Publication Data

US 2014/0281699 A1    Sep. 18, 2014

(51) Int. Cl.
*G06F 11/00* (2006.01)
*G06F 11/14* (2006.01)
*G06F 17/30* (2006.01)
*G06F 9/38* (2006.01)

(52) U.S. Cl.
CPC .............. *G06F 11/1412* (2013.01); *G06F 9/38* (2013.01); *G06F 9/3851* (2013.01); *G06F 9/3861* (2013.01); *G06F 9/3863* (2013.01); *G06F 9/3867* (2013.01); *G06F 11/1471* (2013.01); *G06F 17/30563* (2013.01)

(58) Field of Classification Search
CPC ............ G06F 17/30563; G06F 9/3861; G06F 9/3863; G06F 9/3865; G06F 9/3867; G06F 9/3869; G06F 9/30079; G06F 9/3851; G06F 9/38
USPC .......................................................... 714/15
See application file for complete search history.

(56) References Cited

U.S. PATENT DOCUMENTS

| | | | |
|---|---|---|---|
| 5,819,021 A | 10/1998 | Stanfill et al. | |
| 6,584,581 B1 * | 6/2003 | Bay et al. | 714/16 |
| 7,769,717 B2 | 8/2010 | Federwisch et al. | |
| 2003/0149691 A1 * | 8/2003 | Potts et al. | 707/3 |
| 2012/0216202 A1 * | 8/2012 | Douros et al. | 718/102 |

OTHER PUBLICATIONS

Disclosed Anonymously, "Method to embed resume capability in an ETL environment", IPCOM000200909D, Oct. 29, 2010, 6 pages.
Hibernating Rhinos, "Extract Data From the Database", http://hibernatingrhinos.com/oss/rhino-etl/learn/usage/introduction, retrieved from Internet Jan. 11, 2013, 3 pages.

(Continued)

*Primary Examiner* — Bryce Bonzo
*Assistant Examiner* — Anthony J Amoroso
(74) *Attorney, Agent, or Firm* — Krishna Singhania; SVL IPLaw Edell, Shapiro & Finnan, LLC

(57) ABSTRACT

According to one embodiment of the present invention, a system avoids restart on an error in a data integration process. The system processes data received from a data source in accordance with a parallel processing pipeline and partitioning scheme and submits said processed data to a destination. In response to an indication of an error, the system pauses receiving of data and saves unprocessed data received from the source. After correction of the error, the system resumes processing of the received and saved data in an order of the parallel processing pipeline and partitioning scheme. Embodiments of the present invention further include a method and computer program product for avoiding restart on an error in a data integration process in substantially the same manners described above.

14 Claims, 3 Drawing Sheets

(56) References Cited

OTHER PUBLICATIONS

Freelancer, "Jasper etl hibernate freelancers & jobs | Freelancer.com", http://www.freelancer.com/job-search/jasper-etl-hibernate/, retrieved from Internet Jan. 11, 2013, 5 pages.

Tod means Fox, "ETL Subsystem 24: Recovery and Restart System", http://blog.todmeansfox.com/2008/11/03/etl-subsystem-24-recovery-and-restart-system/, retrieved from Internet Jan. 11, 2013, 3 pages.

* cited by examiner

AVOIDING RESTART ON ERROR IN DATA INTEGRATION

BACKGROUND

1. Technical Field

Present invention embodiments relate to information integration, and more specifically, to avoiding restart of an Extract, Transform, and Load (ETL) process in response to an error.

2. Discussion of the Related Art

Many organizations have adopted distributed data warehouse systems that can store data on a large number of machines and accommodate large amounts of information. Every day, millions of Extract, Transform, and Load (ETL) jobs send data to these data warehouses.

An ETL job may include multiple stages and processes running on many machines. Typically, an ETL job uses a combination of pipeline and partition parallelism, in which data is partitioned and moved through different pipelines in order to improve performance.

Some ETL jobs fail and need to be restarted or resubmitted. For example, the target database within a warehouse may fail to accept a set of records in the middle of a job because a capacity limit is reached or a hardware failure occurs. This may cause the entire job to abort. The user may have to resubmit the job after correcting the failure in order for the data to be successfully processed and submitted to the destination database.

BRIEF SUMMARY

According to one embodiment of the present invention, a system avoids restart on an error in a data integration process. The system processes data received from a data source in accordance with a parallel processing pipeline and partitioning scheme and submits said processed data to a destination. In response to an indication of an error, the system pauses receiving of data and saves unprocessed data received from the source. After correction of the error, the system resumes processing of the received and saved data in an order of the parallel processing pipeline and partitioning scheme. Embodiments of the present invention further include a method and computer program product for avoiding restart on an error in a data integration process in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Figure 1:
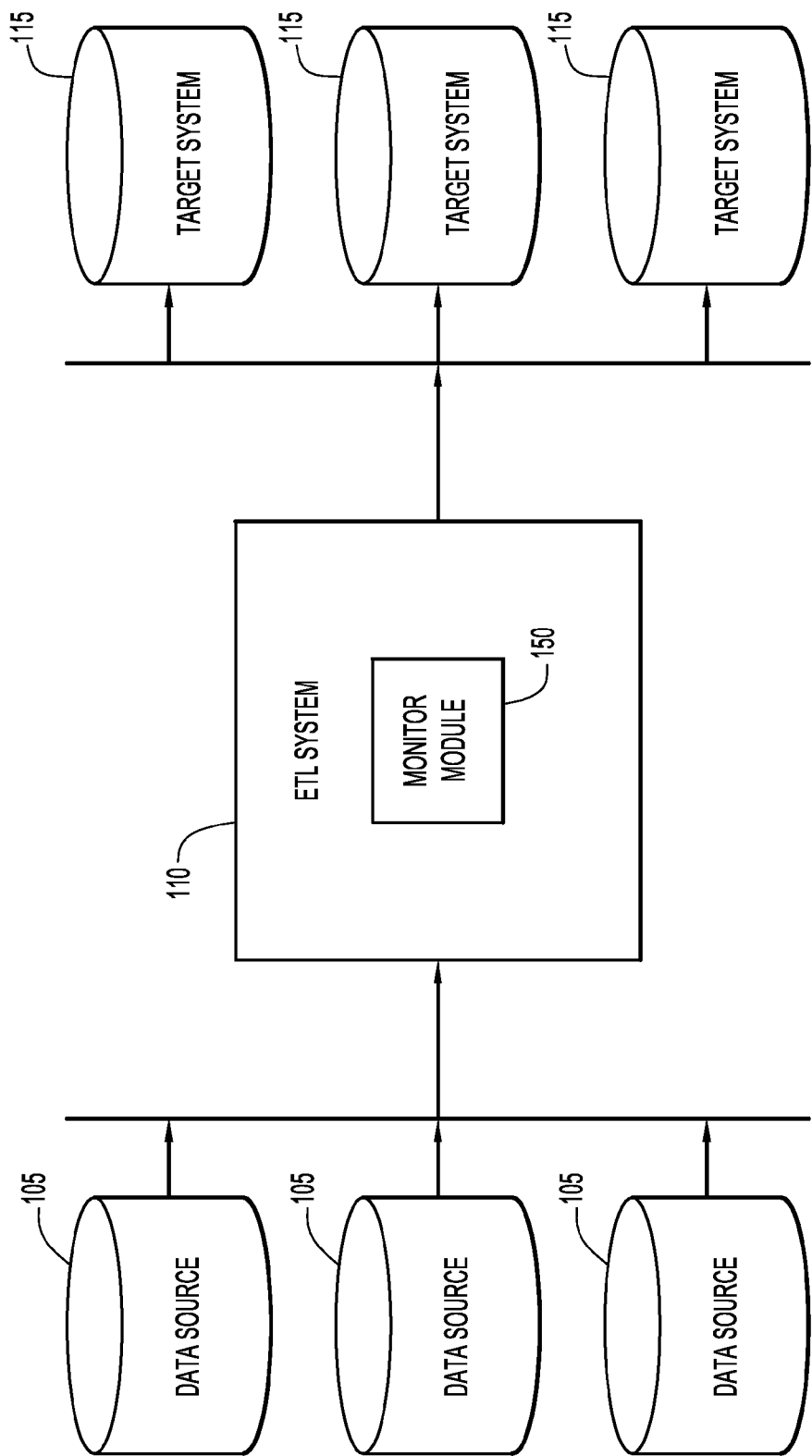
FIG. 1 is a diagrammatic illustration of a computing environment for an embodiment of the present invention.

Present invention embodiments relate to information integration, and more specifically, to avoiding restart (e.g., resubmission) of an Extract, Transform, and Load (ETL) process in response to an error. If an error occurs—for example, a stage of an ETL job throws an exception, such as an RDBMS code or process error code due to an error in an input record or an error writing to a target database—the job may be aborted. Restarting the ETL job in response to the error can be costly.

For some ETL jobs, a checkpoint mechanism can be used to restart the job from the point at which it failed and thereby avoid having to re-read the job from the beginning. A data checkpoint saves information related to the data read so far by a stage. This generally involves storing details of the current state of a process as a checkpoint record so that a process may use the stored information to be restarted from that state. A checkpoint record may include various types of information such as process values, information about successfully processed records and other details relevant to the current execution phase of process. For example, databases support checkpointing which records the number of rows inserted before a failure occurred. The restart procedure uses the checkpoint information in order to resubmit the job from the point where the original job failed (i.e., the next row following the previoush checkpoint). However, the restarted job may not yield correct or expected results when used with parallel pipelines since checkpoints do not guarantee that a data stream will flow through the same pipeline after restart, even when the same partitioning mechanism is used. This is because some of the different mechanisms and methods for partitioning data do not necessarily deliver the same records to the same partition each time they are used. An example is partitioning on a key, where records with a common key pass through one node and records with a different common key pass through a different node. After a failure, the checkpoint mechanism provides information about the number of records processed on a node, but the checkpoint does not know about the partition process. When the job is restarted, the partitioning, and therefore the results, may change (absent manual intervention before reading of data begins again). For example, consider a job processing data with two sets of records identified by the names "Tom" and "Jon". Since the records are partitioned by name, records for Tom are processed on a first node and those for Jon on a second node. After processing twenty records, twelve for Tom and eight for Jon, the job fails. The saved checkpoint information indicates that twelve records were processed on the first node one and eight on the second node. On restart, the first node will begin with the thirteenth record, and the second node will begin with the ninth. But it is not guaranteed that the records for Tom will again be processed on node one.

Thus, a user may have to switch to a single pipeline in order to be able to restart a job using checkpoint information. This may impede performance and/or scalability. Alternatively, a user may have to restart the job from the beginning in order for processing to occur correctly. This may incur a high resource cost. In either case, the resources consumed reading or performing operations on data in the pipeline go to waste. Furthermore, a restart may encounter difficulties because processes, databases, or other resources may be in use by other jobs or otherwise unavailable.

An embodiment of the present invention avoids restarting a job in response to an error by stopping reading of input when an error occurs, buffering data in the pipeline, and causing the job to hibernate while the problem is controlled or rectified. One aspect of an embodiment of the present invention is to respond to an error in a way that saves time and other resources by avoiding a restart of the job. Another aspect is to support pipeline and partition parallelism.

An example computing environment for a present invention embodiment is illustrated in FIG. 1. Specifically, the environment includes one or more data sources 105, a data integration or Extract, Transform, and Load (ETL) system 110, and one or more target systems 115.

ETL system 110 performs an ETL process to extract data from data sources 105 and provide the extracted data to target systems 115. ETL system 110 may send commands to one or more of the data sources 105 such that the data source provides data to ETL system 110. Since the data received may be in multiple formats with varying metadata, the data integration system 110 may reconfigure the received data such that it can be combined for integrated processing. ETL system 110 comprises a monitoring module 150 to respond to errors in the ETL process.

Data sources 105 and target systems 115 may include a wide variety of data systems (e.g., computer systems, database systems, applications, files, etc.) from a wide variety of physical locations. For example, data source 105 and target system 115 may include conventional or other database systems, other application programs, flat files, FTP files, or other systems or sources that provide data and receive data respectively. The target systems 115 are preferably in the form of computer systems, and may include databases (such as a data warehouse).

The data sources 105, ETL system 110, and target systems 115 may be implemented by any conventional or other computer systems preferably equipped with a display or monitor, a base (e.g., including at least one processor, memories and/or internal or external communications devices (e.g., modem, network cards, etc.)), optional input devices (e.g., a keyboard, mouse or other input device), and any commercially available and/or custom software (e.g., ETL software, monitoring module software, communications software, database server software, database client software, etc.).

Data sources 105, ETL system 110, and target systems 115 may communicate over a network. The network may be implemented by any number of any suitable communications media (e.g., wide area network (WAN), local area network (LAN), Internet, intranet, etc.). Alternatively, data sources 105, ETL system 110, and target systems 115 may be local to each other and/or and communicate via any appropriate local communication medium (e.g., local area network (LAN), hardwire, wireless link, intranet, etc.).

Monitoring module 150 may include one or more modules or units to perform the various functions of present invention embodiments described below (e.g., receiving error messages, handling exceptions, signaling nodes and ETL processes, buffering data, etc.), may be implemented by any combination of any quantity of software and/or hardware modules or units, and may reside within memory of a computer system of ETL system 110, data source 105, and/or target system 115 for execution by one or more processors.

Figure 2:
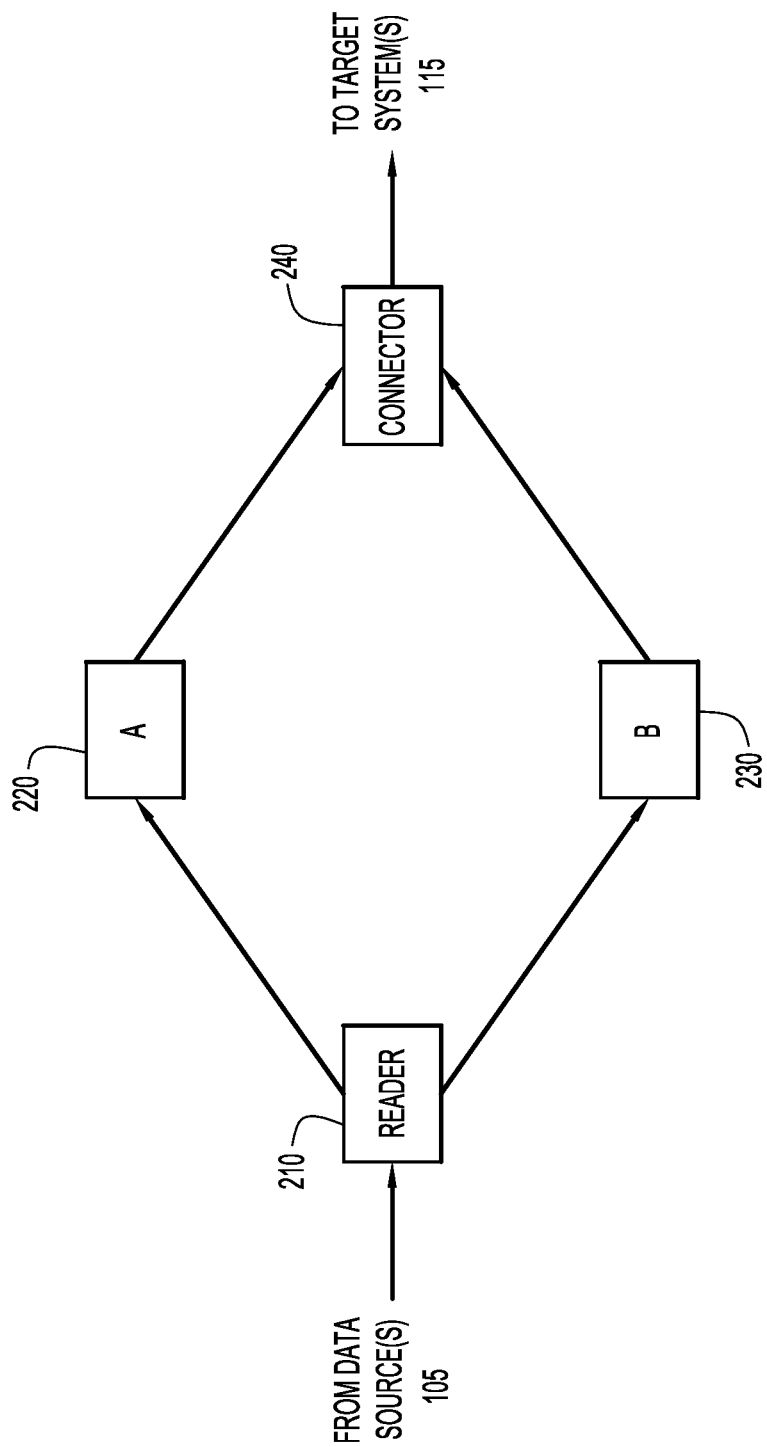
FIG. 2 is a diagrammatic illustration of stages of an Extract, Transform, and Load (ETL) process according to an embodiment of the present invention.

Example stages of an ETL system according to an embodiment of the present invention are illustrated in FIG. 2. The ETL system may comprise a reader stage 210, parallel stages A 220 and B 230, and a connector stage 240. Reader stage 210 receives records from data sources 105 and may pre-process and/or partition the records for distribution to stages A and B. Stages A and B receive records from the reader stage, process the records, and send the results to the connector stage. The connector stage may perform post-processing and consolidation of the results. The connector stage sends the results to target system(s) 115 (e.g., submits the results to a destination database). The ETL stages may be implemented by any combination of software and/or hardware modules or units. In an example configuration, the monitoring module and connector stage reside within memory of a common hardware system.

Figure 3:
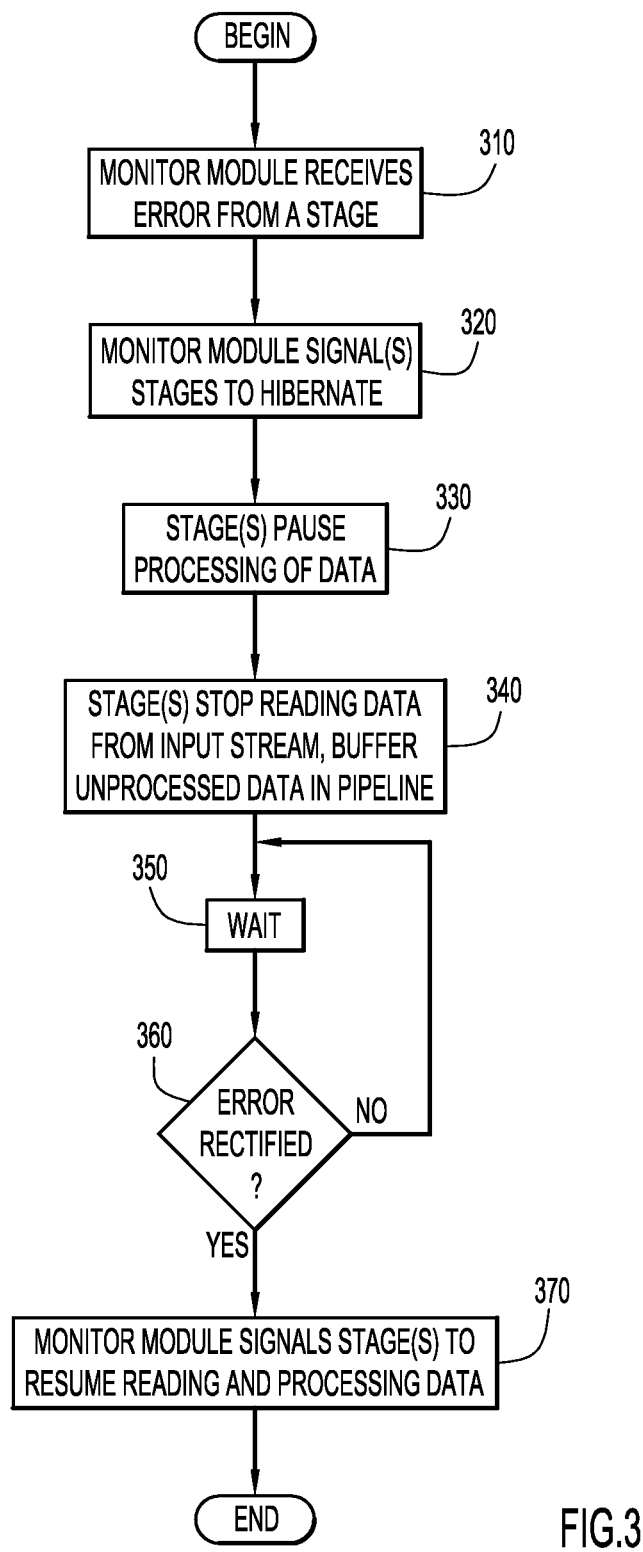
FIG. 3 is a procedural flow chart illustrating an example manner of responding to an error in an ETL process in order to avoid restart.

A manner of responding to an error in order to avoid restart (e.g., via monitor module 150 and ETL system 110) according to an embodiment of the present invention is illustrated in FIG. 3. At step 310, the monitor module receives an indication of an error from a stage. For example, the connector stage may raise an exception because of a fault while writing to the destination database.

Initially, the job is not signaled to abort (i.e., terminate) in response to the indication of an error. Rather, at step 320, in response to the indication of an error, the monitor module signals the reader stage (first stage) to stop reading data records from its input stream, and may signal all stages to hibernate. Each signaled stage pauses processing of data records at step 330 (e.g., threads that process data records may be suspended) and stops reading data records from its input stream at step 340. Each stage buffers unprocessed data records read in the pipeline after the error occurred. The job thereby reaches a state of hibernation or temporary suspension from which it can resume after the error is rectified. The monitor module may wait a predetermined time interval at step 350 and then check to determine whether the error has been cleared (e.g., the monitor module can poll the stage that raised an error). If the error has been cleared, the monitor module signals each stage to resume reading and processing data at step 370. If the error has not been cleared, the procedure returns to step 350 and again waits before checking to determine whether the error has been cleared. Optionally, after a pre-configured number of iterations waiting and determining that the error has not been cleared, the monitoring module may take additional and/or alternative action (e.g., aborting the job, raising an alarm, etc.). Alternatively, the job may automatically attempt to resume processing after a predetermined interval.

Since each stage can buffer data (e.g., in memory) and the job sleeps rather than terminates in response to an error, the job can resume processing from the point at which it left off once the error is rectified. This avoids wasting resources spent processing data in the pipeline(s) and avoids restarting the job and having to serialize the pipelines or manually intervene to guarantee consistent coordination of parallel pipelines and partitions.

In an example case, an ETL process having more than twenty-five stages and about ten million records to process and deliver to a data warehouse (ultimately writing to a table in a high capacity database system) consumes about seventy minutes and processes about six million records before a 'NO ROOM in database' message is thrown by the stage that writes to the database.

According to current methods, a user checks the availability of resources for restarting/resubmitting the data and schedules a restart of the job. The restart begins processing the job from record N+1, where the checkpoint information indicates that the previous job processed through record N. But the next iteration is not guaranteed to process the same set of rows because of pipeline and partition parallelism, and therefore may change the behavior of the job. Hence the user may have to use a single node configuration, which sacrifices performance.

According to an embodiment of the present invention, the monitoring module within the connector stage, which writes the data into target table in database, notifies the stages to pause reading data in their input streams once it catches the database management system error code ('NO ROOM in database'). Data contained in the parallel pipelines (i.e., including unprocessed data and data which is just read after the exception occurred and before the signal from the monitor module to pause is caught) is saved/buffered. The monitor module polls after a user-defined time interval and queries the database for its current status. Polling continues until the problem is rectified (e.g., the user increases the spool space). The monitor module notifies the first stage to resume reading the data and processes the buffered data. In the example case, this can save up to about ninety minutes of production time when a job encounters an error. Further, the parallel pipelining and partitioning for the data are maintained (relative to those in the job prior to the suspension) for the data to ensure accurate results.

It will be appreciated that the embodiments described above and illustrated in the drawings represent only a few of the many ways of implementing embodiments for avoiding restart on error in a data integration process.

The topology or environment of the present invention embodiments may include any number of computer or other processing systems (e.g., data sources, ETL systems, ETL stages, target systems, client or end-user systems, etc.) databases, or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any commercially available or custom software (e.g., ETL management software, ETL stage software, monitor module software, database software, communications software, etc.). These systems may include any types of monitors and input devices (e.g., keyboard, mouse, voice recognition, touch screen, etc.) to enter and/or view information.

It is to be understood that the software (e.g., ETL management software, ETL stage software, monitor module software, database software, communications software, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various data source systems, ETL systems, target systems, ETL stages, end-user/client and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The monitor module may use any manner of signaling to notify a stage to pause reading and/or processing of data records. For example, stages may be implemented using a base class that contains a serialized status object that provides the signal. The status object may be transmitted via the data stream. Alternatively, the monitor module may communicate with stages via socket/pipe/circular queue. Data in a pipeline may be buffered in any manner (e.g., by supporting buffering in a read routine common to stages, custom buffering for a stage, etc.) in any type of buffer (e.g., RAM, flat file, database, etc.).

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other data storage systems (e.g., databases, files, arrays, data structures, etc.) to store information (e.g., source data, metadata, configuration data, data records in an ETL pipeline, etc.). The database systems may be implemented by any number of any conventional or other databases, data stores or storage structures (e.g., files, databases, data structures, data or other repositories, etc.) to store information (e.g, data from the data sources, data for target systems, data records in an ETL pipeline, metadata, configuration data, etc.). Data sources 105 and target systems 115, may be included within or coupled to the ETL system, the ETL stages, and/or client systems.

Present invention embodiments may be used to avoid restart in integration of data of any type (e.g., integer data, floating point data, categorical data, text, etc.) stored in any format or system (e.g., database, text files, binary files, web pages, etc.) representing any type of information (e.g., commercial data, scientific data, reference materials, etc.). The data integration may be performed by any suitable integration process (e.g., ETL, etc.).

The present invention embodiments may employ any number of any type of user interface (e.g., Graphical User Interface (GUI), command-line, prompt, etc.) for obtaining or providing information (e.g., configuring ETL or monitoring module parameters, scheduling jobs, correcting faults, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.).

The present invention embodiments are not limited to the specific tasks, algorithms, or network/environment described above, but may be utilized for avoiding restart in integration of any type of any data following an error of any type by any stage of the data integration.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for avoiding restart on an error in a data integration process comprising:
   at least one processor configured to:
      process data received from a data source in accordance with a parallel processing pipeline and partitioning scheme and submit said processed data to a destination, a first portion of the data being processed on a first pipeline and a second portion of the data being processed on a second pipeline;
      in response to an indication of an error, pause said receiving of data and save unprocessed data received from said source; and
      after correction of said error, resume processing of said received and saved data, said parallel processing pipeline and partitioning scheme being maintained upon said resuming such that the first portion of the data continues to be processed on the first pipeline and the second portion of the data continues to be processed on the second pipeline.

2. The system of claim 1, wherein said processing comprises a plurality of stages.

3. The system of claim 2, wherein said processing comprises partitioning said received data.

4. The system of claim 3, wherein said plurality of stages comprises at least two parallel stages.

5. The system of claim 2, wherein each stage saves data received by that stage and unprocessed by that stage in response to said indication of an error.

6. The system of claim 5, wherein said at least one processor is further configured to suspend each stage of processing in response to said indication of an error.

7. The system of claim 2, wherein said at least one processor is further configured to poll said stages to determine whether said error has been corrected.

8. A computer program product for avoiding restart on an error in a data integration process comprising:
   a non-transitory computer readable storage medium having computer readable program code embodied therewith for execution on a first processing system, the computer readable program code comprising computer readable program code configured to:
      process data received from a data source in accordance with a parallel processing pipeline and partitioning scheme and submit said processed data to a destination, a first portion of the data being processed on a first pipeline and a second portion of the data being processed on a second pipeline;
      in response to an indication of an error, pause said receiving of data and save unprocessed data received from said source; and
      after correction of said error, resume processing of said received and saved data, said parallel processing pipeline and partitioning scheme being maintained upon said resuming such that the first portion of the data continues to be processed on the first pipeline and the second portion of the data continues to be processed on the second pipeline.

9. The computer program product of claim 8, wherein said processing comprises a plurality of stages.

10. The computer program product of claim 9, wherein said processing comprises partitioning said received data.

11. The computer program product of claim 10, wherein said plurality of stages comprises at least two parallel stages.

12. The computer program product of claim 9, wherein each stage saves data received by that stage and unprocessed by that stage in response to said indication of an error.

13. The computer program product of claim 12, wherein said computer readable program code is further configured to suspend each stage of processing in response to said indication of an error.

14. The computer program product of claim 9, wherein said computer readable program code is further configured to poll said stages to determine whether said error has been corrected.

* * * * *